(12) United States Patent
Freeman et al.

(10) Patent No.: US 7,249,249 B2
(45) Date of Patent: Jul. 24, 2007

(54) DYNAMIC HARDFILE SIZE ALLOCATION TO SECURE DATA

(75) Inventors: Joseph Wayne Freeman, Raleigh, NC (US); Steven Dale Goodman, Raleigh, NC (US); Randall Scott Springfield, Chapel Hill, NC (US)

(73) Assignee: Lenovo, Singapore (SG)

( * ) Notice: Subject to any disclaimer, the term of this patent is extended or adjusted under 35 U.S.C. 154(b) by 741 days.

(21) Appl. No.: 10/064,087

(22) Filed: Jun. 10, 2002

(65) Prior Publication Data
US 2003/0229774 A1 Dec. 11, 2003

(51) Int. Cl.
*G06F 15/177* (2006.01)
(52) U.S. Cl. ............................. 713/1; 713/100
(58) Field of Classification Search ............... 713/1, 713/2, 100
See application file for complete search history.

(56) References Cited

U.S. PATENT DOCUMENTS

| | | | |
|---|---|---|---|
| 5,537,540 A * | 7/1996 | Miller et al. ................... 714/38 |
| 5,542,044 A | 7/1996 | Pope |
| 5,754,821 A * | 5/1998 | Cripe et al. .................. 711/164 |
| 6,026,016 A * | 2/2000 | Gafken .................. 365/185.04 |
| 6,052,781 A * | 4/2000 | Weber .......................... 713/200 |
| 6,088,759 A * | 7/2000 | Hasbun et al. ............... 711/103 |
| 6,192,477 B1 | 2/2001 | Corthell |
| 6,401,183 B1 * | 6/2002 | Rafizadeh ..................... 711/173 |
| 6,542,979 B1 * | 4/2003 | Eckardt ........................ 711/173 |
| 6,633,976 B1 * | 10/2003 | Stevens ............................ 713/2 |
| 6,711,660 B1 * | 3/2004 | Milne et al. .................. 711/173 |
| 6,829,725 B2 * | 12/2004 | Gurumoorthy et al. ......... 714/23 |
| 2002/0133702 A1 * | 9/2002 | Stevens ........................ 713/163 |
| 2002/0157010 A1 * | 10/2002 | Dayan et al. ................. 713/191 |
| 2002/0166059 A1 * | 11/2002 | Rickey et al. ............... 713/200 |
| 2003/0014619 A1 * | 1/2003 | Cheston et al. ................. 713/1 |
| 2003/0120918 A1 * | 6/2003 | VanDer Kamp ............ 713/164 |
| 2003/0163610 A1 * | 8/2003 | Stevens .......................... 710/8 |

OTHER PUBLICATIONS

E.P. van Westendorp "Hidden partitions", Sep. 14, 2000, pp. 1-4.*
Peter T. McLean, "Information Technology AT Attachment with Packet Interface-6 (ATA/ATAPI-6)", Working Draft T13 1410D Revision 3a, Dec. 14, 2001, pp. 44-45.*
Dan Colegrove et al., "Proposal of an improved Description of Read Native Max and Set Max Commands including rules for C/H/S and LBA calculation", Mar. 28, 1997, pp. 1-12.*
Botha, Reinhardt A. et al., "Information Security in a Client/Server Environment," Elektron, Feb. 1997, vol. 14, pp. 17-18.
"Remote Operation of Power-On Self Test and the Reference Partition," IBM Technical Disclosure Bulletin, Aug. 1994, vol. 37, No. 8, pp. 655-656.

* cited by examiner

*Primary Examiner*—Chun Cao
(74) *Attorney, Agent, or Firm*—Sawyer Law Group LLP

(57) ABSTRACT

A system and method for access control of a hardfile responsive to a computer system having an operating system is disclosed. The method includes detecting a special boot condition during a pre-boot test of the computer system; and altering, in response to the special boot condition, an operating system access configuration of the hardfile. The system includes a computer system that adjusts an operating system access to a hardfile based upon various boot conditions.

24 Claims, 3 Drawing Sheets

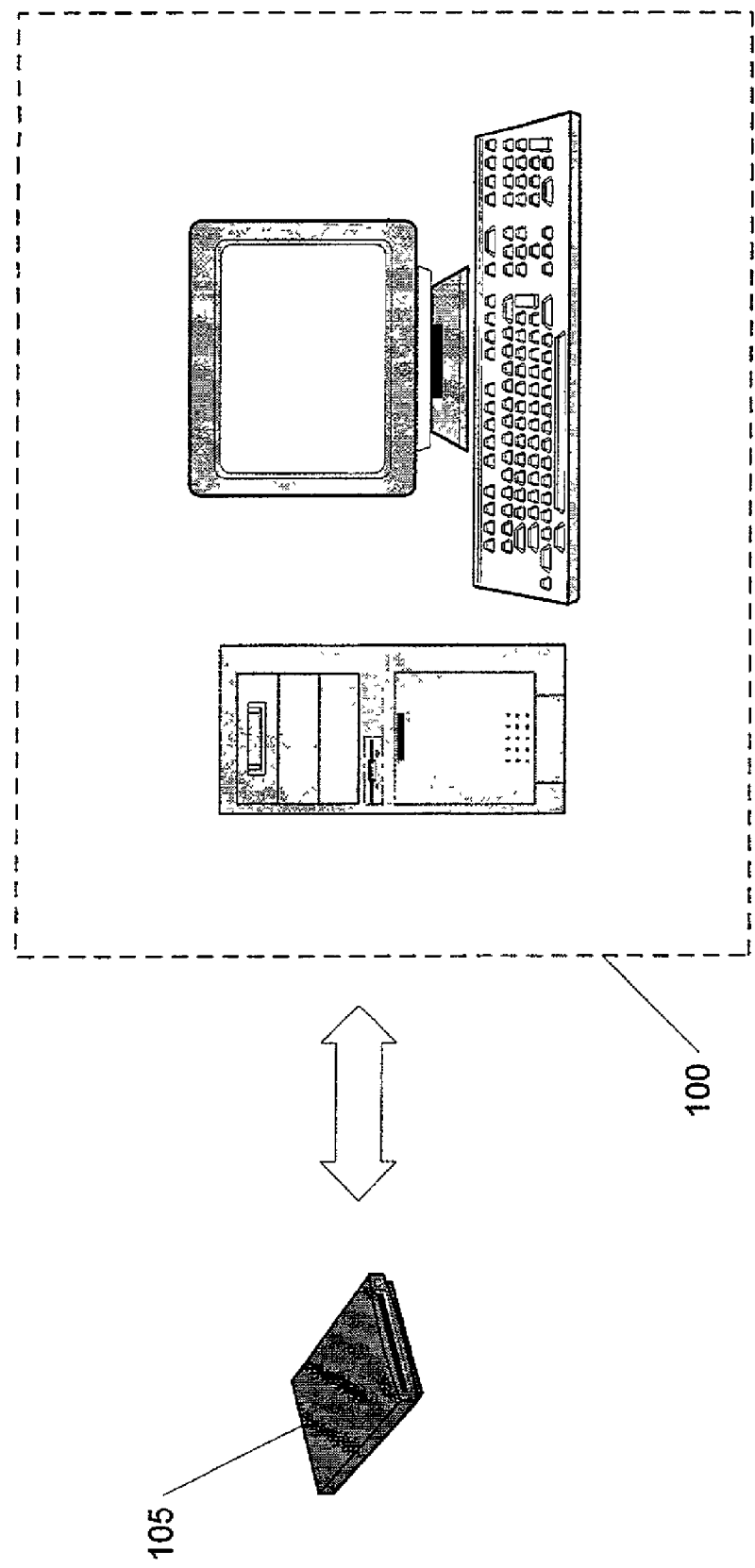
FIGURE_1

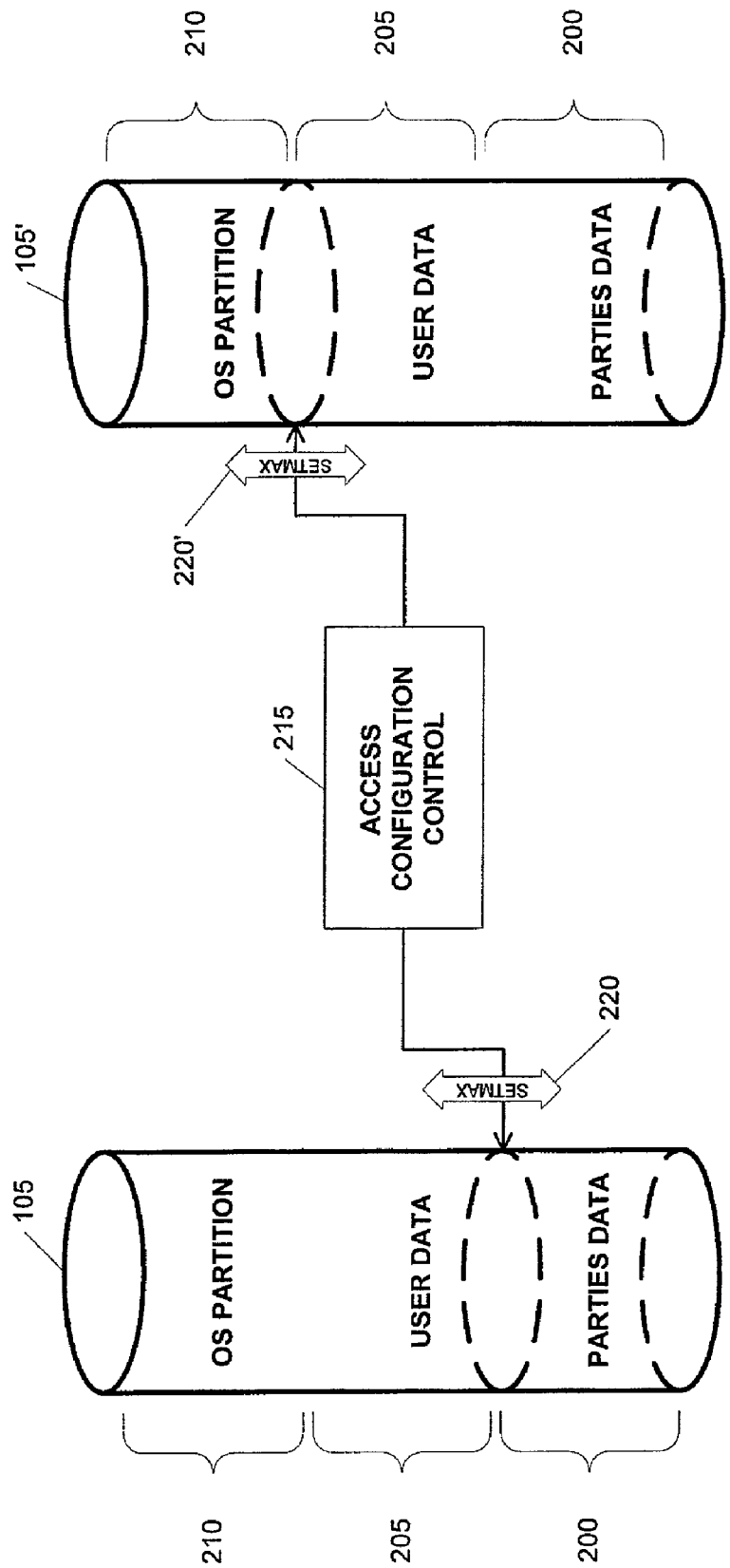
FIGURE_2

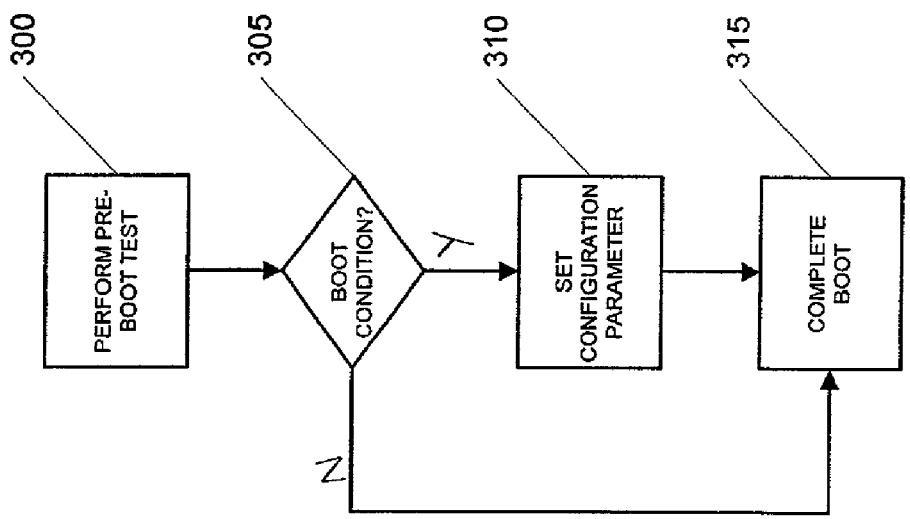
FIGURE_3

DYNAMIC HARDFILE SIZE ALLOCATION TO SECURE DATA

FIELD OF THE INVENTION

The present invention relates generally to computer system user data security, and more specifically to access control/protection of nonvolatile memory systems like computer hardfiles.

BACKGROUND OF THE INVENTION

Although the manufacture and use of a hardfile for a computer system is well known, the industry continues to develop solutions for enhancing the security and availability of the computer systems, and the components used in these computer systems. The development of security systems to restrict and control access to computer system resources and user data and applications has caused an undesirable side effect.

There are many reasons why an unauthorized user of the computer system resources and user data of a computer system should at times be permitted to have limited access to the operating system of the computer system, and various hardware/software utilities. For example, in the case when a computer technician installs new hardware for use with the computer system, the technician often needs to boot the computer system into an operational mode to properly configure the hardware and the computer system to use the new hardware. Sometimes one or more new software applications must be installed or existing applications may need to be modified. For existing computer systems, an administrator of a secured machine has had two options: 1) permit general access to the computer system, the resources and the user data and applications, or 2) deny the technician access. Sometimes access is enabled by properly entering special security information, for example a login identification and a password. When an administrator happens to be present and available, the administrator is able to enter the special security information to enable the technician to access the computer system.

In some cases the technician's access to computer system resources or application data is limited by the operating system according to a limited-permissions account. Unfortunately, many changes to the computer system require access privileges for the technician that are not properly limited by a non-administrator account. Further, the technician sometimes performs the services at times or locations when and where there is no administrator physically present. The administrator is often left with the unpleasant decision to forego the installation or to give security access information to the technician over the telephone or through other means that compromises the security of the computer system.

Further, administrators are responsible for safeguarding the computer systems and user applications/data not just from authorized access, but also from possible data loss or corruption through inadvertent or malicious users or applications. Also, misinstallation of some hardware and/or software has been attributed as contributing to data loss and corruption. Therefore it may be desirable to have an administrator confirm the technician's installation and run virus or other pest detection programs prior to enabling full operational mode of the installation or otherwise enables access to the entire enterprise.

Accordingly, what is needed is a system and method for enabling reconfiguration of the computer system to allow for partial access to a hardfile by the operating system, utilities and in some cases certain applications of the computer system while preserving user data and applications. The present invention addresses such a need.

SUMMARY OF INVENTION

A system and method for access control of a hardfile responsive to a computer system having an operating system is disclosed. The method includes detecting a special boot condition during a pre-boot test of the computer system; and altering, in response to the special boot condition, an operating system access configuration of the hardfile. The system includes a computer system that adjusts an operating system access to a hardfile based upon various boot conditions.

The present invention efficiently addresses reconfiguration of a computer system to provide for two or more operational modes, with each mode providing increasingly more (or less) access to computer resources and/or user applications and data. The reconfiguration is most preferably set automatically responsive to a special boot condition detected during a pre-boot procedure of the computer system. Upon detecting the special boot condition, a hardfile is reconfigured to permit the operating system to have access to as much of the hardfile as indicated by the special boot condition. The reconfiguration is performed at the hardware level and the operating system is unable to access any deselected parts of the hardfile.

BRIEF DESCRIPTION OF DRAWINGS

FIG. 1 is a general-purpose computer system for use with a hardfile according to a preferred embodiment;

FIG. 2 is a schematic block diagram of a reconfiguration of a hardfile according to a preferred embodiment; and FIG. 3 is a flowchart for a preferred embodiment of the invention.

DETAILED DESCRIPTION

The present invention relates to computer system data security and integrity. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

FIG. 1 is a general-purpose computer system 100 for use with a hardfile 105 according to a preferred embodiment. The general construction of computer system 100 is well-known, including a central processing unit (CPU) or microprocessor unit (MPU) interconnected by one or more internal buses to computer subsystems (e.g., memory, I/O (keyboard, mouse, monitor, for example), communication systems (modem and network, for example), and storage units (volatile and non volatile, and fixed or removable, of many different types). Computer system 100 typically operates under program control, the program most commonly stored on non-volatile computer readable media, such as for example hardfile 105, a hard drive, read-only memory (ROM). The programs, and the set of instructions, are executable by computer system 100 to perform the identified procedures of the code. The particular selection and configuration may vary widely depending upon many different factors.

The present invention is adaptable to many different kinds of computer systems for many different uses, so the specific details of computer system 100 are not shown but described in very general fashion. A common factor among general-purpose computer systems 100 is that an operating system and user data and application software are installed and accessed from hardfile 105. In most cases, hardfile 105 is physically integrated with computer system 100. In other instances, hardfile 105 may be physically removed or distinct from computer system 100. For example, hardfile 105 may be connected to computer system 100 by a local area network (LAN) or wide-area network (WAN). In some cases, hardfile 105 may include removable media.

In these various configurations, hardfile 105 includes non-volatile memory for storing an operating system used by computer system 100, and typically user data and application software. Most commonly, hardfile 105 is a fixed hard drive storing the information on magnetic media. Computer system 100 includes a hard drive adapter for controlling the storage and retrieval when hardfile 105 is a hard drive. Computer system 100 will typically include other control and data interfaces when hardfile 105 is not a hard drive, but adapting the present invention to such alternate hardfile systems is within the skill of a person of ordinary skill in the art and would be achieved from this disclosure without undue experimentation. To simplify the discussion, the preferred embodiment will be described in the case that hardfile 105 is a hard drive.

In the preferred embodiment, hardfile 105 complies with applicable standards for an ATA/ATAPI-4 (NCITS 314-1998) or later compliant hard drive, the standard hereby expressly incorporated by reference for all purposes. Hardfile 105 must include at least one partition, and in some cases, there may be multiple logical partitions accessible to computer system 100. In the ATAPI-4 standard, hardfile 105 may be established optionally with an additional partition referred to as a Protected Area Run Time Interface Extension Services or simply PARTIES partition prior to loading the operating system. The PARTIES partition often is set by computer system 100 using a firmware interface (PARTIES) for controlling and accessing this PARTIES partition, and is invisible or otherwise non-accessible to most conventional computer subsystems or conventional routines of the operating system. The PARTIES partition is used to store administration or non-user data. ATAPI-4 provides a procedure called SETMAX that adjusts the size of this PARTIES partition. The preferred embodiment of the present invention uses this SETMAX procedure in a way not contemplated by the standard to provide a novel use of the PARTIES partition to secure data. NCITS can be reached at www.ncits.org.

In operation and also as well known, various conditions will initiate a power on self-test (POST) of computer system 100. The POST checks various hardware and software conditions of computer system 100 as part of a pre-boot procedure. In the typical scenario, the POST determines that computer system 100 is in condition for operation. Computer system 100 dynamically sets the SETMAX parameter to provide full access to the operating system to complete the boot-up procedure, as well as to provide full access to the user data and application software stored in a different part of hardfile 105.

In the event that the POST detects a special boot condition, computer system 100 dynamically adjusts SETMAX to exclude all or a portion of hardfile 105 from access by the operating system. The special boot condition may be any type of hardware, software or firmware condition that, in the particular application, would suggest limiting access to part of hardfile 105.

In the preferred embodiment, a hardware tamper indication detected during the POST causes computer system 100 to dynamically configure SETMAX. The reconfiguration sets the PARTIES partition large enough to exclude the region of hardfile 105 that includes user data and software applications while providing computer system 100 with access to the operating system and any diagnostic/remedial tools or utilities.

Adjusting SETMAX in this fashion is advantageous over prior art solutions that either suspended or aborted the boot or ignored the condition and issued a warning. Both solutions are at times unsatisfactory, in contrast to the flexibility of the preferred embodiment.

When the hardware/software tamper was consequential to a legitimate reconfiguration of computer system 100, the limited hardfile access permits the technician, operator or administrator to test the reconfiguration without exposing the user data and software applications to possible loss or corruption due to bad hardware/software or misinstallation. By using the PARTIES partition in this fashion, computer system 100 is unable to access those portions of hardfile 105 storing the data and software applications, greatly decreasing the risk.

When the hardware/software tamper was consequential to an unauthorized access of computer system 100, the limited hardfile access isolates the user data and software applications from unauthorized access or destruction, again greatly decreasing any risk to the user data.

It is an advantage that computer system 100 is operational, and selected portions of the functionality may be configured to be available at all times. Computer system 100 is therefore able to assist in evaluating the post-tamper changes and to aid an administrator in deciding whether to restore computer system 100 to full functionality.

Adjusting SETMAX to its original value restores computer system 100 to full functionality. Depending upon the desired application, the preferred embodiment either resets SETMAX when the tamper condition is cleared, or after a manual flag is set/cleared by use of a utility application.

FIG. 2 is a schematic block diagram illustrating dynamic reconfiguration of hardfile 105 according to a preferred embodiment. According to the preferred embodiment, hardfile 105 is configured to include at least two distinct (physical or logical) storage areas, but preferably three. A first region 200 of hardfile 105 includes the PARTIES partition, a second region 205 includes the user data and application software, and a third region 210 includes the operating system. Computer system 100, by use of a hardfile controller 215 for example, sets a SETMAX value 220 as discussed above to include or exclude second region 205 from access by the operating system of computer system 100.

Hardfile 105 illustrates the full operational mode when SETMAX value 220 allows the operating system access to both first region 200 and second region 205. Hardfile 105' illustrates a limited operational mode when SETMAX value 220' allows the operating system access to only first region 200.

FIG. 3 is a flowchart for a preferred embodiment of the invention implemented by computer system 100. Computer system 100 performs a pre-boot test at step 300 to test for any type of hardware, software or firmware condition that, in the particular application, would suggest limiting access to part of hardfile 105, or, to test whether a previously limited access should be changed or expanded. Computer system 300 tests, at step 305, whether any special boot condition was detected at step 300.

If the test at step 305 is yes, computer system 100 sets the configuration parameter of hardfile 105 to the appropriate level, given the detected boot condition. For example, if a hardware tamper is detected and hardfile 105 is an IDE/ATAPI-4 hard drive, computer system 105 sets SETMAX to a smaller size than the full readable size of the hard drive and limits the size to a minimum for operating system access. If for example the boot condition is a clearing of a previous tamper condition and hardfile 105 is an IDE/ATAP-4 hard drive, computer system 100 sets SETMAX to be larger and include more of hardfile 105 for access.

After setting the configuration parameter at step 310, computer system 100 completes the boot sequence at step 315. At step 305, if computer system 100 does not detect a special boot condition, computer system 100 performs step 315 and completes the boot sequence without altering the configuration parameter of hardfile 105.

While the preferred embodiment has been described in terms of a dual operational mode for hardfile 105, the present invention is not so limited. In some applications, it may be desirable or beneficial to provide for three or more operational modes of hardfile 105. In this application, various boot conditions may lead to degrees of access to user data or software applications. In some embodiments, user credentials being made available before the SETMAX value is established can provide for increased data security over user/permission based access systems.

Also, the preferred embodiment uses the SETMAX value to achieve reconfigurable access control to regions of the hardfile. This access control uses physical arrangement and placement of data structures in conjunction with adjustment of the SETMAX value. The present invention contemplates other mechanisms for identifying and segregating the hardfile. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A method for access control of a hardfile in a computer system having an operating system, the method comprising:
   detecting a special boot condition during a pre-boot test of the computer system, the special boot condition being a detect of a hardware tamper of the computer system or a detect of a software tamper of the computer system; and
   in response to detecting the special boot condition, adjusting a size of a partition of the hardfile to alter an operating system access configuration of the hardfile, the size of the partition of the hardfile being adjusted to reduce access of the operating system to data stored on the hardfile during the hardware tamper or the software tamper.

2. The method of claim 1, wherein adjusting a size of a partition of the hardfile dynamically sets a maximum accessible size of the hardfile.

3. The method of claim 1, wherein the hardfile is a hard drive.

4. The method of claim 1, wherein the operating system is stored on a first part of the hardfile and user data is stored on a second part of the hardfile, and wherein adjusting a size of a partition of the hardfile sets the hardfile access to exclude the second part of the hardfile from access by the operating system.

5. The method of claim 2, wherein the operating system is stored on a first part of the hardfile and user data is stored on a second part of the hardfile, and wherein adjusting a size of a partition of the hardfile sets the hardfile maximum size to exclude the second part of the hardfile from access by the operating system.

6. The method of claim 4, wherein:
   the hardware tamper corresponds to installation of new hardware for use with the computer system; and
   the software tamper corresponds to installation of a new software application on the computer system.

7. The method of claim 1, wherein adjusting a size of a partition of the hardfile includes adjusting a size of a Protected Area Run Time Interface Extension Services (PARTIES) partition.

8. The method of claim 7, further comprising using a SETMAX procedure to adjust the size of the PARTIES partition.

9. A storage system for a computer system having an operating system and a pre-boot procedure, the storage system comprising:
   a hardfile for non-volatile storage of the operating system on a first part of the hardfile and a plurality of user data on a second part of the hardfile; and
   a hardfile controller, coupled to the hardfile and responsive to a special boot condition detected by the pre-boot procedure, operable to dynamically reconfigure operating system access to the hardfile including adjusting a size of a partition of the hardfile to permit access to both the first part of the hardfile and the second part of the hardfile in a first mode and to permit access to only the first part of the hardfile in a second mode, the special boot condition being a detect of a hardware tamper of the computer system or a detect of a software tamper of the computer system.

10. A storage system for a computer system having an operating system, the storage system comprising:
   a hardfile for non-volatile storage of the operating system on a first part of the hardfile and a plurality of user data on a second part of the hardfile; and
   a hardfile controller, coupled to the hardfile and responsive to a special boot condition detected by a pre-boot procedure of the computer system, operable to dynamically reconfigure operating system access to the hardfile including adjusting a size of a partition of the hardfile to permit access to both the first part of the hardfile and the second part of the hardfile in a first mode and to permit access to only the first part of the hardfile in a second mode, the special boot condition being a detect of a hardware tamper of the computer system or a detect of a software tamper of the computer system.

11. A storage system controller for a hardfile of a computer system having an operating system and a pre-boot procedure, the hardfile for non-volatile storage of the operating system on a first part of the hardfile and a plurality of user data on a second part of the hardfile, the storage system controller comprising:
   a hardfile controller, coupled to the hardfile and responsive to a special boot condition detected by the pre-boot procedure, operable to dynamically reconfigure operating system access to the hardfile including adjusting a size of a partition of the hardfile to permit access to both the first part of the hardfile and the second part of the hardfile in a first mode and to permit access by the operating system to only the first part of the hardfile in a second mode, the special boot condition being a detect of a hardware tamper of the computer system or a detect of a software tamper of the computer system.

12. A storage system controller for a hardfile of a computer system having an operating system, the hardfile for non-volatile storage of the operating system on a first part of the hardfile and a plurality of user data on a second part of the hardfile, the storage system controller comprising:
   a hardfile controller, coupled to the hardfile and responsive to a special boot condition detected by a pre-boot procedure of the computer system, operable to dynamically reconfigure operating system access to the hardfile including adjusting a size of a partition of the hardfile to permit access to both the first part of the hardfile and the second part of the hardfile in a first mode and to permit access by the operating system to only the first part of the hardfile in a second modes the special boot condition being a detect of a hardware tamper of the computer system or a detect of a software tamper of the computer system.

13. A hardfile system for a computer system, the hardfile system comprising:
   a hardfile for non-volatile storage of a operating system and user data;
   means, coupled to the computer system, for detecting a special boot condition during a pre-boot test of the computer system, the special boot condition being a detect of a hardware tamper of the computer system or a detect of a software tamper of the computer system; and
   means, coupled to the hardfile and to the detecting means, for adjusting a size of a partition of the hardfile to alter an operating system access configuration of the hardfile in response to detecting the special boot condition, the size of the partition of the hardfile being adjusted to reduce access of the operating system to data stored on the hardfile during the hardware tamper or the software tamper.

14. A computer usable medium having computer readable program code means embodied therein for access control of a hardfile, responsive to a hardfile controller included in a computer system having an operating system performing a pre-boot test, the computer readable program code means in the computer usable medium comprising:
   computer readable program code means for causing the computer system to detect a special boot condition during the pre-boot test, the special boot condition being a detect of a hardware tamper of the computer system or a detect of a software tamper of the computer system; and
   computer readable program code means for causing the computer system to adjust a size of a partition of the hardfile to alter an operating system access configuration parameter of the hardfile in response to detection of the special boot condition, the size of the partition of the hardfile being adjusted to reduce access of the operating system to data stored on the hardfile during the hardware tamper or the software tamper.

15. The computer usable medium of claim 14, wherein:
   the hardware tamper corresponds to installation of new hardware for use with the computer system; and
   the software tamper corresponds to installation of a new software application on the computer system.

16. The computer usable medium of claim 14, wherein the hardfile is a hard disk.

17. The computer usable medium of claim 16, wherein the configuration parameter is a SETMAX value.

18. A computer readable medium containing program instructions, tangibly stored thereon, for access control of a hard file in a computer system, the program instructions for:
   detecting a special boot condition during the pre-boot test, the special boot condition being a detect of a hardware tamper of the computer system or a detect of a software tamper of the computer system; and
   in response to detecting the special boot condition, adjusting a size of a partition of the hardfile to alter an operating system access configuration of an access parameter of the hardfile, the size of the partition of the hardfile being adjusted to reduce access of the operating system to data stored on the hardfile during the hardware tamper or the software tamper.

19. The computer readable medium of claim 18, wherein:
   the hardware tamper corresponds to installation of new hardware for use with the computer system; and
   the software tamper corresponds to installation of a new software application on the computer system.

20. The computer readable medium of claim 18, wherein the hardfile is a hard disk.

21. A method for controlling access of an operating system to data in a hard drive of a computer system, the method comprising:
   providing a computer system including a hard drive, the hard drive including one or more of user data or software applications in a first portion of the hard drive;
   initiating a power on self-test of the computer system;
   determining whether a pre-determined condition occurs to limit access to the one or more of user data or software applications in the first portion of the hard drive, the pre-determined condition being one or more of
      a detection of installation of a new hardware for use with the computer system, or
      a detection of installation of a new software application on the computer system; and
   if the pre-determined condition occurs then dynamically adjusting a size of a partition of the hard drive during the power on self-test to exclude access of the operating system to the one or more of user data or software applications in the first portion of the hard drive during the installation of the new hardware for use with the computer system or the installation of the new software application on the computer system;
   otherwise providing the operating system full access to the one or more of user data or software applications in the first portion of the hard drive.

22. The method of claim 21, wherein dynamically adjusting a size of a partition includes adjusting a size of a Protected Area Run Time Interface Extension Services (PARTIES) partition.

23. The method of claim 22, wherein the hard drive is a ATAPI-4 compliant hard drive.

24. The method of claim 21, wherein dynamically adjusting a size of a partition of the hard drive further comprises providing the operating system access to a diagnostic tool on the hard drive to permit one or more of the installation of the new hardware for use with the computer system, or the installation of the new software application on the computer system.

* * * * *